United States Patent
Hamamatsu et al.

(10) Patent No.: US 7,586,230 B2
(45) Date of Patent: Sep. 8, 2009

(54) BRUSH, COMMUTATOR, AND COMMUTATOR DEVICE

(75) Inventors: Hirotake Hamamatsu, Nagoya (JP); Youichi Murakami, Ama-gun (JP); Ryoichi Honbo, Obu (JP); Kenzo Kiyose, Takahama (JP); Mitsuo Ikeda, Matsusaka (JP); Yoichi Sakaura, Matsusaka (JP); Shinya Nakagawa, Watarai-gun (JP); Makoto Nishio, Matsusaka (JP)

(73) Assignees: Denso Corporation, Kariya, Aichi-Pref. (JP); Tris, Inc., Matsusaka, Mie-Pref. (JP)

( * ) Notice: Subject to any disclaimer, the term of this patent is extended or adjusted under 35 U.S.C. 154(b) by 472 days.

(21) Appl. No.: 11/289,642

(22) Filed: Nov. 30, 2005

(65) Prior Publication Data

US 2006/0131983 A1 Jun. 22, 2006

(30) Foreign Application Priority Data

Nov. 30, 2004 (JP) ............................. 2004-345982
Sep. 30, 2005 (JP) ............................. 2005-287714

(51) Int. Cl.
*H02K 13/00* (2006.01)
(52) U.S. Cl. ...................... 310/251; 310/233
(58) Field of Classification Search ................ 310/233, 310/249, 251
See application file for complete search history.

(56) References Cited

U.S. PATENT DOCUMENTS

| 4,019,076 | A | | 4/1977 | Bates | |
|---|---|---|---|---|---|
| 5,252,418 | A | * | 10/1993 | Ishikawa et al. | ............... 430/67 |
| 6,528,923 | B2 | | 3/2003 | Katoh et al. | |
| 2001/0015590 | A1 | | 8/2001 | Katoh et al. | |
| 2002/0070625 | A1 | | 6/2002 | Katoh et al. | |
| 2004/0195825 | A1 | * | 10/2004 | Anraku et al. | ................. 285/94 |
| 2006/0024430 | A1 | * | 2/2006 | Yau et al. | .................... 427/97.9 |
| 2007/0035196 | A1 | | 2/2007 | Sidgwick | |

FOREIGN PATENT DOCUMENTS

| DE | 195 49 195 | 7/1997 |
|---|---|---|
| DE | 8319428 | 9/2003 |
| GB | 2 839 358 | 12/2003 |

(Continued)

OTHER PUBLICATIONS

Examination Report dated Jan. 25, 2008 in CN application No. 200510128556.X with English translation.

(Continued)

*Primary Examiner*—Nguyen N Hanh
(74) *Attorney, Agent, or Firm*—Nixon & Vanderhye PC

(57) ABSTRACT

In a commutator of a rotary electric machine, each of commutator segments has a low-resistive layer made of a low-resistive material and a high-resistive layer made of a high-resistive material having a specific resistance higher than that of the low-resistive material. The low-resistive material contains a carbonic material and a binder. The high-resistive material contains a carbonic material, a binder and an inorganic substance such as boron nitride. A mixing ratio of the inorganic material to the high-resistive material is more than 20 wt %. Alternatively, a brush, which makes contact with the commutator segments, can have the high-resistive layer and the low-resistive layer.

6 Claims, 8 Drawing Sheets

FOREIGN PATENT DOCUMENTS

| | | | |
|---|---|---|---|
| JP | 5-15114 | | 1/1993 |
| JP | 2001-351758 | | 12/2001 |
| JP | 2003-274613 | * | 3/2002 |
| JP | 2003-100411 | | 4/2003 |
| WO | WO 2004/075373 | * | 9/2004 |

OTHER PUBLICATIONS

German Official Action, dated Jun. 16, 2008, issued in corresponding German Appln. No. 10 2005 057 063.1-32, with English translation.
Chinese Office Action dated Jun. 8, 2007 in Chinese Application No. 200510128556.X together with an English translation.

* cited by examiner

BRUSH, COMMUTATOR, AND COMMUTATOR DEVICE

CROSS REFERENCE TO RELATED APPLICATION

This application is based on Japanese Patent Applications No. 2004-345982 filed on Nov. 30, 2004 and No. 2005-287714 filed on Sep. 30, 2005, the disclosures of which are incorporated herein by reference.

FIELD OF THE INVENTION

The present invention relates to a brush, a commutator, and a commutator device, which are used in a rotary electric machine such as an electric machine and a generator.

BACKGROUND OF THE INVENTION

In a generator such as a d.c. motor, generally, a pair of brushes is arranged on a stator and a commutator is arranged on a rotor. In the rotor, a plurality of armature windings are connected to commutator segments of the commutator, respectively. The pair of brushes is sequentially pressed against the commutator segments to supply the armature windings with electric currents, thereby rotating the rotor.

However, the brushes and the commutator segments are intermittently and repeatedly in contact with each other. Therefore, contact surfaces between the brushes and commutator segments are likely to be electrically abraded by the intermittent conduction, in addition to mechanical abrasion by press-contacting. This electric abrasion results from a discharge phenomenon (sparks) which occurs while the brushes repeatedly contact with and separate from the commutator segments.

To reduce such a discharge phenomenon, it is known to use a laminated brush constructed of two layers having different contents of copper against graphite, as disclosed in Japanese Unexamined Patent Publication No. 5-15114. Specifically, the brush has a high Cu-content section on a leading side and a low Cu-content section, which has a copper content lower than that of the high Cu-content section, on a trailing side with respect to the rotation direction of the commutator. By this construction, the life of brush is improved without deteriorating the performance of a rotary electric machine.

In the above brush, however, the performance such as conductivity is maintained by the high Cu-content section, and abrasion resistance is improved by the low Cu-content section. Therefore, it is difficult to further improve rectification (rectifying characteristic) and durability of the brush and the commutator.

In a brush disclosed in Japanese Unexamined Patent Publication No. 2003-100411, groups of protrusions are formed on a brush surface that contacts with commutator surfaces of a commutator. Further, the protrusions are formed at different phases against the rotation direction of the commutator. By this construction, initial vibration is suppressed, and durability of the brush is improved. Also, the brush is produced by adding 20 wt % or less boron nitride as lubricant into conductive metallic powder such as copper powder, graphite powder, and a binder. However, this brush is constructed by a single layer. Therefore, it is difficult to further improve rectification and durability.

SUMMARY OF THE INVENTION

The present invention is made in view of the foregoing matters, and it is an object of the present invention to provide a brush, a commutator and a commutator device, with enhanced rectification and durability.

According to a first aspect of the present invention, a brush, which makes contact with commutator segments of a commutator, has a low-resistive layer made of a low-resistive material and a high-resistive layer made of a high-resistive material having a specific resistance higher than that of the low-resistive material. Further, the high-resistive material contains an inorganic substance whose specific resistance is higher than that of the low-resistive material more than 20 wt % with respect to a total weight of the high-resistive material.

Accordingly, conductivity of the brush is intentionally deteriorated at the high resistive layer by adding the inorganic substance having the high specific resistance in the high-resistive layer, thereby improving rectification and durability. Namely, during the rotation of a rotary electric machine having the above brush and commutator, an electric current easily passes from the low-resistive layer of the brush to a commutator segment (first commutator segment), which is opposed to the brush.

Then, when the brush becomes in contact with a second commutator segment, which is adjacent to the first commutator segment, the low-resistive layer is opposed to the second commutator segment and the high-resistive layer is opposed to the first commutator segment with a small contact area. At this time, since the conductivity of the high-resistive layer is deteriorated, the electric current easily passes to the second commutator segment from the low-resistive layer. On the contrary, the amount of electric current between the high-resistive layer and the first commutator segment is reduced. With this, an increase in voltage between the high-resistive layer of the brush and the first commutator segment is suppressed, thereby reducing occurrence of discharge phenomenon, such as sparks, between them.

In this way, a conducting state and a nonconducting state between the brush and the commutator segments are distinguished from each other. Thus, rectification improves in the rotary electric machine. Further, since the occurrence of discharge phenomenon between the brush and the commutator segments are suppressed, durability of the brush and the commutator improves.

According to a second aspect of the present invention, each of the commutator segments, which makes contact with a brush, has a low-resistive layer and a high-resistive layer. The low-resistive layer is made of a low-resistive material and the high-resistive layer is made of a high-resistive material having a specific resistance higher than that of the low-resistive material. Further, the high-resistive material contains an inorganic substance whose specific resistance is higher than that of the low-resistive material more than 20 wt % with respect to a total weight of the high-resistive material.

Accordingly, conductivity is intentionally deteriorated at the high-resistive layer of the commutator segment by adding the inorganic substance in the high-resistive material. During the rotation of a rotary electric machine having the above commutator segments and brush, an electric current easily passes from the brush to the low-resistive layer of a first commutator segment, which is opposed to the brush. Further, when the brush becomes in contact with a second commutator segment, which is adjacent to the first commutator segment, the brush is opposed to the low-resistive layer of the second commutator segment as well as the high-resistive layer of the first commutator segment with a small contact area.

Since the conductivity is deteriorated at the high-resistive layer, the electric current easily passes from the brush to the low-resistive layer of the second commutator segment. On the contrary, the amount of electric current passing between the brush and the high-resistive layer of the first commutator segment is reduced. Accordingly, occurrence of discharge phenomenon between the brush and the first commutator segment is reduced.

Accordingly, since the conducting state and the nonconducting state between the commutator segments and the brush are distinguished from each other, rectification improves. Further, since the discharge phenomenon is suppressed, durability of the brush and the commutator improves.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
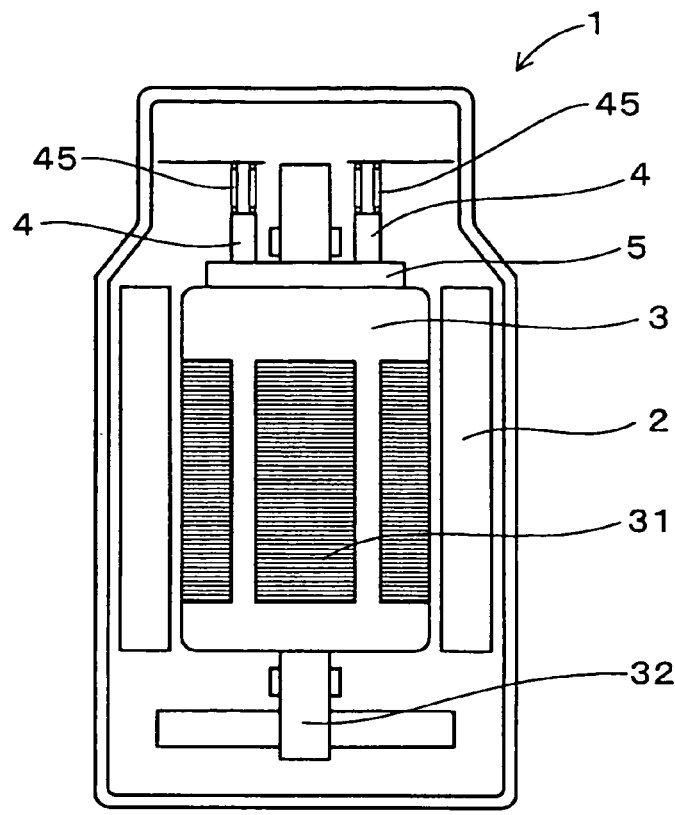
FIG. 1 is a schematic view of a d.c. motor according to a first embodiment of the present invention.

Embodiments of the present invention will be described hereinafter with reference to the drawing.

First Embodiment

Figure 2:
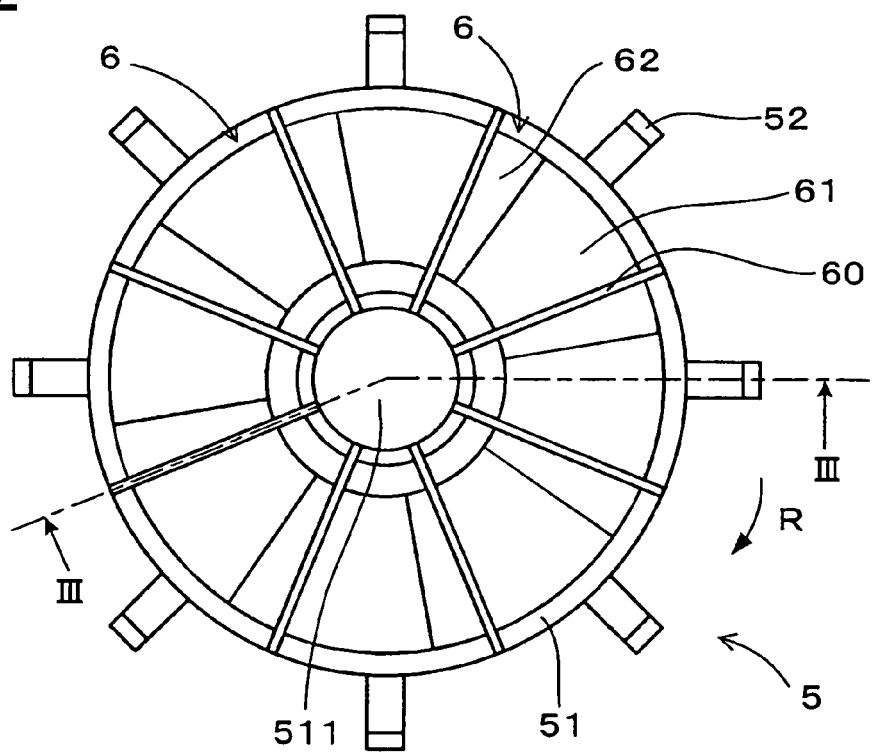
FIG. 2 is a plan view of a commutator, when viewed along a rotation axis of the rotor, according to the first embodiment of the present invention.
Figure 4:
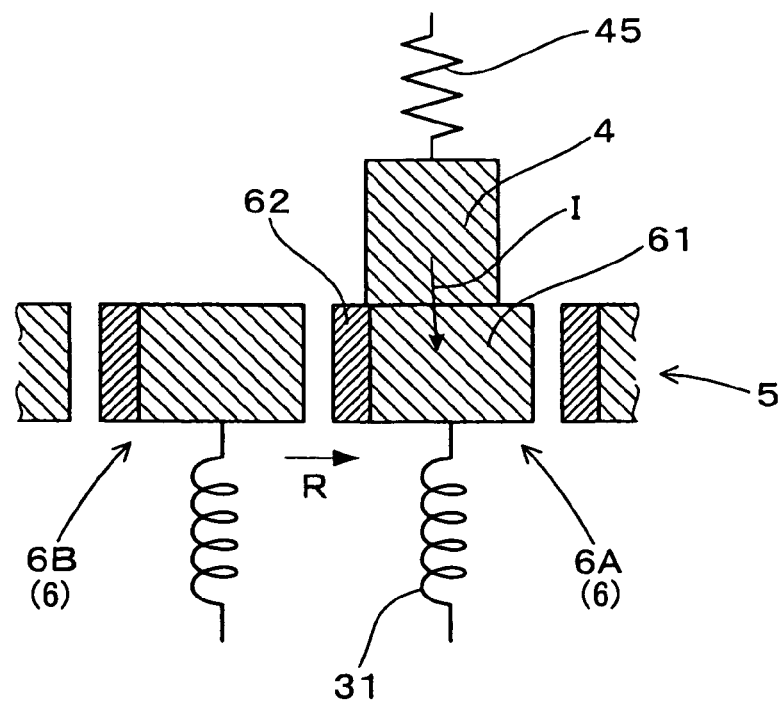
FIG. 4 is a schematic sectional view of a brush and the commutator in which the brush contacts with a first commutator segment, according to the first embodiment of the present invention.
Figure 5:
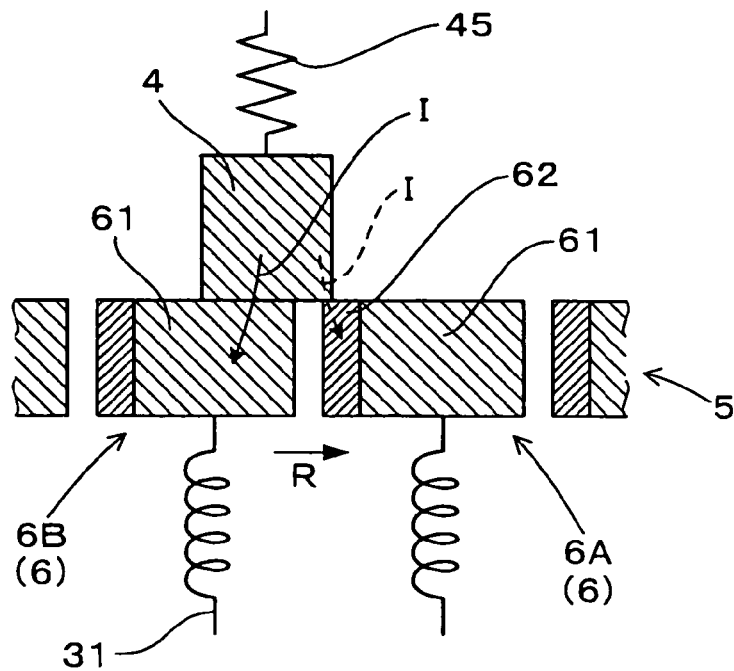
FIG. 5 is a schematic sectional view of the brush and the commutator in which the brush contacts with the first commutator segment and a second commutator segment, according to the first embodiment of the present invention.

Referring to FIGS. 1 and 2, a brush 4 and a commutator 5 of the first embodiment are used in a d.c. motor 1 as a rotary electric machine. The d.c. motor 1 has a stator 2 provided with permanent magnets or a field winding, and a rotor 3 provided with a plurality of armature windings 31. A pair of brushes 4 is arranged on the stator 2 for supplying direct current. The commutator 5 is connected to a rotor shaft 32 of the rotor 3. The commutator 5 has a plurality of commutator segments 6 that are connected to the armature windings 31, respectively, as shown in FIGS. 4 and 5.

Figure 3:
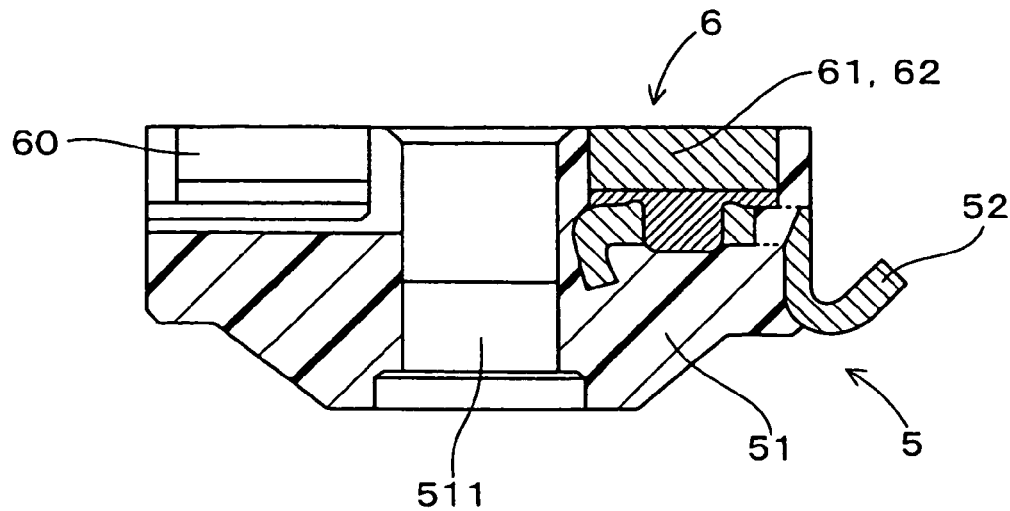
FIG. 3 is a cross-sectional view of the commutator taken along a line III-III of FIG. 2.

As shown in FIGS. 2 and 3, the commutator 5 is a flat-type, and is located on an axial end surface of the rotor 3 to make contact with the brushes 4. Specifically, the commutator segments 6 are mounted on a resinous body member 51 having a disk shape. The commutator segments 6 are arranged to extend from a center 511 of the body member 51 in a radial direction. Further, clearances 60 are defined between the adjacent commutator segments 6 for providing insulation between them.

Further, as shown in FIG. 3, connecting members 52 are provided between the respective commutator segments 6 and the body member 51. Thus, each commutator segment 6 is connected to the armature winding 31 through the connecting member 52. The brushes 4 are urged toward the commutator 5 by springs 45. Thus, the brushes 4 make contact with the commutator 5 in the axial direction of the commutator 5.

The d.c. motor 1 is for example used in a fuel pump for a vehicle. In the d.c. motor 1, the rotor 3 is rotated in one direction R, as shown in FIGS. 2, 4, and 5. Each of the commutator segments 6 has two layers. Specifically, the commutator segment 6 has a low-resistive layer 61 on a leading side and a high-resistive layer 62 on a trailing side with respect to the rotation direction R. Further, a width of the brush 4 in the rotation direction R is smaller than a width of the commutator segment 6.

Here, the low-resistive layer 61 is made of a low-resistive material. The high-resistive layer 62 is made of a high-resistive material having a specific resistance higher than that of the low-resistive material.

Further, the low-resistive material contains a carbonic material and a binder. The high-resistive material contains a carbonic material, a binder and boron nitride (BN) as an inorganic substance. A mixing ratio of the boron nitride is more than 20 wt % against a total weight of the high-resistive material.

More specifically, the low-resistive material is produced by adding phenol aldehyde resin as the binder to the carbonic material such as graphite. The high-resistive material is produced by adding phenol aldehyde resin as the binder to a mixed material including boron nitride and the carbonic material such as graphite. Here, a content of boron nitride in the mixed material is in a range between 65 wt % and 85 wt %. In the embodiment, hexagonal boron nitride (h-BN) is used as the boron nitride. Further, the brush 4 is produced by adding phenol aldehyde resin as a binder to a carbonic material such as graphite.

Accordingly, in the commutator 5 of the embodiment, boron nitride having a high specific resistance is positively added in the high-resistive material of the high-resistive layer 62. Thus, conductivity of the high-resistive layer 62 is intentionally deteriorated, thereby to improve rectification and durability.

Next, the operation condition of the d.c. motor 1 and advantageous effects produced by the commutator 5 will be described.

Referring to FIG. 4, when each of the brushes 4 is opposed to a first commutator segment 6A, which is one of the commutator segments 6, electric current I is supplied to the armature winding 31 through the brush 4 and the low-resistive layer 61 of the first commutator segment 6A. Therefore, the rotor 3 rotates. At this time, since the electric current I passes through the low-resistive layer 61 whose specific resistance is lower than that of the high-resistive layer 62, conductivity between the brush 4 and the first commutator segment 6A is sufficiently maintained.

Then, the brush 4 becomes in contact with a second commutator segment 6B that is adjacent to the first commutator segment 6A, with the rotation of the rotor 3. While the commutator segment 6 that is opposed to the respective brush 4 is shifting from the first commutator segment 6A to the second commutator segment 6B, the brush 4 is opposed to the low-resistive layer 61 of the second commutator segment 6B as well as the high-resistive layer 62 of the first commutator segment with a small contact area, as shown in FIG. 5.

Since the conductivity is purposely deteriorated at the high-resistive layer 62, the electric current I easily passes between the brush 4 and the low-resistive layer 61 of the second commutator segment 6B. On the contrary, the amount of electric current I passing between the brush 4 and the high-resistive layer 62 of the first commutator segment 6A is suppressed.

Namely, when the commutator segment 6 opposed to the brush 4 is shifted from the first commutator segment 6A to the second commutator segment 6B, an opposing area (contact area) between the brush 4 and the first commutator segment 6A is reduced. Therefore, an electric resistance between them increases. At this time, the electric current I is easily supplied to the low-resistive layer 61 by a resistance gap between the high-resistive layer 62 and the low-resistive layer 61. On the contrary, the electric current I remaining in the high-resistive layer 62 is reduced. Accordingly, damage resulting from the discharge phenomenon, such as abrasion of the brushes 4 and the commutator segments 6, is suppressed.

Further, the high-resistive layer 62 contains boron nitride having a high heat resistance. Therefore, even if the high-resistive layer 62 of the first commutator segment 6A is highly heated at a time when a voltage between the brush 4 and the high-resistive layer 62 of the first commutator segment 6A is increased, abrasion of the high-resistive layer 62 is effectively reduced.

Here, the first commutator segment 6A and the second commutator segment 6B are used for convenience of the explanation. The above advantageous effects can be provided by any commutator segments 6.

Accordingly, a conducting state and a nonconducting state between the brush 4 and the commutator 5 are adequately distinguished from each other. Therefore, rectification of the d.c. motor 1 improves. Furthermore, since discharging phenomenon occurring between the brushes 4 and the commutator segments 6 are suppressed in the commutator 5, durability of the brushes 4 and the commutator 5 improves.

In the low-resistive material of the low-resistive layer 61, it is preferable to contain graphite particles having copper plate coatings. In this case, a contact resistance of the low-resistive layer 61 is reduced. This will be described in a later seventh embodiment more in detail.

In the high-resistive material of the high-resistive layer 62 containing the boron nitride, it is preferable to have a porosity of equal to or less than 30%. This is advantageous when the brush 4 and the commutator 5 are used in liquid because an increase of the specific resistance of the high-resistive layer 62 over time is effectively suppressed. This will be described in a later eighth embodiment more in detail.

In the brush 4 produced by graphite and the binder, it is preferable that the graphite includes the carbon fiber. In this case, discharging phenomenon between the brushes 4 and the commutator segments 6 are further effectively reduced. This will be described in a later ninth embodiment more in detail. This brush 4 and the above commutator 5 construct a commutator device.

Second Embodiment

Figure 6:
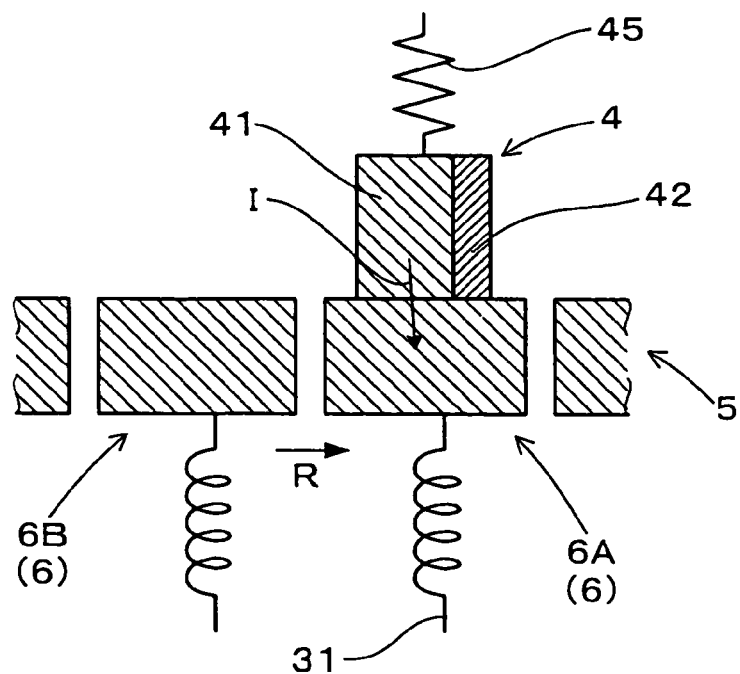
FIG. 6 is a schematic sectional view of a brush and a commutator in which the brush contacts with a first commutator segment, according to a second embodiment of the present invention.
Figure 7:
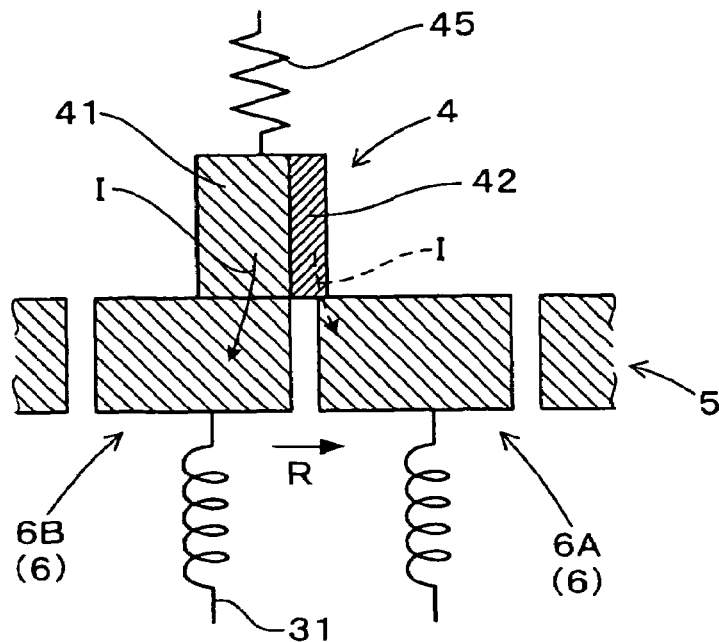
FIG. 7 is a schematic view of the brush and the commutator in which the brush contacts with the first commutator segment and a second commutator segment, according to the second embodiment of the present invention.

Referring to FIGS. 6 and 7, a d.c. motor 1 of the second embodiment has the pair of brushes 4 each of which is constructed of two resistive layers and the commutator 5 having a plurality of commutator segments 6 each of which is constructed of a single layer. Specifically, each of the brushes 4 has a low-resistive layer 41 made of a low-resistive material and a high-resistive layer 42 made of a high-resistive material having a specific resistance higher than that of the low-resistive material.

The low-resistive material contains a carbonic material and a binder. The high-resistive material contains a carbonic material, a binder, and boron nitride (BN) as an inorganic substance. Here, a mixing ratio of the boron nitride is higher than 20 wt % against a total weight of the high-resistive material.

The d.c. motor 1 of the second embodiment is used in a fuel pump for a vehicle, and a rotor 3 of the d.c. motor 1 is rotated in one direction R. As shown in FIGS. 6 and 7, each of the brushes 4 has the high-resistive layer 42 on a leading side with respect to the rotation direction R and the low-resistive layer 41 on a trailing side. Here, the width of the brush 4 is smaller than the width of each commutator segment 6, with respect to the rotation direction R.

The low-resistive material of the low-resistive layer 41 is the same as the low-resistive material of the low-resistive layer 61 of the first embodiment. Also, the high-resistive material of the high-resistive layer 42 is the same as the high-resistive material of the high-resistive layer 62 of the first embodiment. Further, the commutator segments 6 are made of the material same as the material of the brush 4 of the first embodiment.

In the brush 4, the high-resistive material of the high-resistive layer 42 contains boron nitride having a specific resistance higher than that of the low-resistive material. Thus, conductivity of the high-resistive layer 42 is intentionally deteriorated, to thereby improve rectification and durability.

Next, the operation condition of the d.c. motor 1 having the above brushes 4 and advantageous effects obtained by the brushes 4 will be described.

As shown in FIG. 6, when each of the brushes 4 is opposed to a first commutator segment 6A, the electric current I is supplied to the armature winding 31 through the low-resistive layer 41 and the first commutator segment 6A. Thus, the rotor 3 rotates. At this time, since the electric current I passes through the low-resistive layer 41 having the specific resistance lower than that of the high-resistive layer 42, conductivity between the brush 4 and the first commutator segment 6A is sufficiently maintained.

Then, each of the brushes 4 is opposed to a second commutator segment 6B that is adjacent to the first commutator segment 6A, with the rotation of the rotor 3, as shown in FIG. 7. While the commutator segment that is opposed to the brush 4 is shifting from the first commutator segment 6A to the second commutator segment 6B, the high-resistive layer 42 is opposed to the first commutator segment 6A with a small contact area and the low-resistive layer 41 is opposed to the second commutator segment 6B.

Since the conductivity is intentionally reduced at the high-resistive layer 42, the electric current I easily passes from the low-resistive layer 41 and the second commutator segment 6B. On the other hand, the amount of the electric current I passing from the high-resistive layer 42 to the first commutator segment 6A is reduced. That is, when the commutator segment 6 opposed to the brush 4 is shifted from the first commutator segment 6A to the second commutator segment 6B, an opposing area (contact area) between the high-resistive layer 42 and the first commutator segment 6A is reduced.

Therefore, the electric resistance between the brush 4 and the first commutator segment 6A increases. At this time, by the resistance gap between the low-resistive layer 41 and the high-resistive layer 42, the electric current I is easily supplied through the low-resistive layer 41. On the contrary, the electric current I remaining in the high-resistive layer 42 is reduced. Therefore, damage due to occurrence of electric discharge, such as abrasion of the brush 4 and the commutator segments 6, is suppressed.

Further, the high-resistive layer 42 contains boron nitride having a high heat resistance. Even if the high-resistive layer 42 is highly heated at the time when the voltage between the high-resistive layer 42 and the first commutator segment 6A is increased, abrasion of the high-resistive layer 42 is effectively suppressed. Here, the first commutator segment 6A and the second commutator segment 6B are used for the convenience of explanation.

Accordingly, a conducting state and a nonconducting state between the commutator 5 and the brush 4 are adequately distinguished by the high-resistive layer 42 and the low-resistive layer 41. Therefore, rectification in the d.c. motor 1 improves. In addition, since the discharge phenomenon between the brush 4 and the commutator segments 6 are suppressed, durability of the brushes 4 and the commutator segments 6 improves.

Structure of the second embodiment other than the brushes 4 and the commutator segments 6 is similar to the structure of the first embodiment. Therefore, the d.c. motor 1 of the second embodiment provides advantageous effects similar to those of the first embodiment.

In the d.c. motor for the fuel pump, discharge phenomenon is likely to easily occur because of fuel remaining between the brushes and the commutator. This discharge phenomenon results in abrasion of brushes 4 and the commutator segments 6. By employing the brushes 4 of the second embodiment or the commutator 5 of the first embodiment in the d.c. motor 1, occurrence of the electric abrasion is effectively reduced.

Third Embodiment

Hereafter, an example of the method of producing the commutator 5 of the first embodiment and the brushes 4 of the second embodiment will be described.

The commutator segment 6 and the brushes 4 having two resistive layers 41, 42, 61, 62 are produced as follows.

First, as a method of producing the high-resistive material, carbonic powder such as graphite (e.g. 25 wt % natural graphite powder having an average particle diameter of 30 μm) and inorganic powder such as boron nitride (e.g. 75 wt % hexagonal boron nitride powder having an average particle diameter of 10 μm) are mixed into each other. Then, novolac phenol aldehyde resin (e.g. 15 weight ratio), which is dissolved in methanol solution (e.g. 30 weight ratio), is added in the mixed powder (100 weight ratio), as the binder. Further, the mixture is kneaded by a mixer, and to thereby produce the mixed material.

After, the mixed material is dried in a drier to evaporate methanol. Thus, a block of the high-resistive material is obtained. Further, the block of the high-resistive material is crushed by an impact grinder, and screened through a predetermined sieve. In this way, high-resistive material powder is produced.

As a method of producing the low-resistive material powder, first, carbon powder such as graphite (e.g. natural graphite having an average particle diameter 30 μm, 100 wt %) and novolac phenol aldehyde resin as a binder, which is dissolved in methanol solution, are mixed into each other. Similarly, the mixture is dried to evaporate methanol, and is crushed. Accordingly, the low-resistive material powder is produced.

Next, by using powder metallurgy compacting, the low-resistive material powder and the high-resistive material powder are alternately arranged in a predetermined-shaped forming die, and pressed by a press. Thus, a compact having a predetermined shape is produced. Then, the compact is placed in an electric furnace and heated in a reducing atmosphere to 900° C. Thus, the binder is resolved and burned by carbonization. In this way, the brush 4 and the commutator 5 having two resistive layers 41, 42, 61, 62 are produced.

Fourth Embodiment

In the fourth embodiment, selection of the inorganic substance added in the high-resistive material of the high-resistive layers 42, 62 will be described.

As shown in a following table 1, substances, which may be used as the inorganic substance, are examined in view of a specific resistance (Ω·cm), a boiling point (° C.), and Moh's hardness. Moh's hardness is represented by 15 levels. Level 15 represents the hardest level.

In the table 1, "+" represents that it is suitable as for the inorganic substance. "0" represents that it is available to be used as the inorganic substance. "−" represents that it is less suitable as the inorganic substance. Also, $(CF)_n$ represents carbon fluoride.

TABLE 1

| | Specific resistance (Ω · cm) | | Boiling Point (° C.) | | Moh's Hardness (1-15) | |
|---|---|---|---|---|---|---|
| C | $2.6 \times 10^{-3}$ | | 3650 | | 1-2 | + |
| $MoS_2$ | 8.33 | + | 1800< | 0 | 1-2 | + |
| $WS_2$ | 14 | + | 1420 | 0 | 1-2 | + |
| h-BN | $10^{14}<$ | + | 2700 | 0 | 2 | + |
| $(CF)_n$ | nonconductor | + | 320-420 | − | 1-2 | + |
| $Si_3N_4$ | $6 \times 10^{14}$ | + | 2150 | 0 | 9 | − |
| $Al_2O_3$ | $10^{14}<$ | + | 3200 | 0 | 12 | − |
| $SiO_2$ | $10^{14}<$ | + | 2200 | 0 | 12 | − |
| $ZrO_2$ | $10^{14}<$ | + | 4500 | + | 8 | − |
| Kaolin | $10^{14}<$ | + | 2200 | 0 | 3 | 0 |
| Talc | $10^{14}<$ | + | | | 1 | + |

Specifically, in view of the specific resistance, it is considered that the substances other than carbon (C) are suitable as the inorganic substance. In view of the boiling point, it is considered that the higher the boiling point is, the higher the heat resistance is. Based on this, the boiling point of each substance is evaluated with three levels. "+" represents the highest level and "−" represents the lowest level.

In view of Moh's hardness, it is considered that the substance having Moh's hardness similar to that of the low-resistive material of the low-resistive layers 41, 61, has abrasion rate similar to that of the low-resistive material. Further, such a substance can suppress occurrence of the discharge phenomenon due to vibration of the brush. Therefore, the substance having Moh's hardness 1 to 2, which is similar to Moh's hardness of carbon, is evaluated more suitable.

As a result of the examination, molybdenum disulfide ($MOS_2$), tungsten disulfide ($WS_2$), hexagonal boron nitride (h-BN), Kaolin, Talc can be used as the inorganic substance.

Fifth Embodiment

In the fifth embodiment, an abrasion rate of the high-resistive layer 62 is examined. Here, the high-resistive layer contains one of $MOS_2$, $WS_2$, h-BN, Kaolin, Talc, as the inorganic substance. In the examination, high-resistive layers of the commutator segments are made of the following high-resistive materials I to VII.

I: High-resistive material containing the mixed powder (mixed material) obtained by mixing 95 w % $MOS_2$ and 5 wt % carbonic material, and the binder.
II: High-resistive material containing the mixed powder obtained by mixing 95 wt % $WS_2$ and 5 wt % carbonic material, and the binder.
III: High-resistive material containing the mixed powder obtained by mixing 65 wt % h-BN and 35 wt % carbonic material, and the binder.
IV: High-resistive material containing the mixed powder obtained by mixing 75 wt % h-BN and 25 wt % carbonic material, and the binder.
V: High-resistive material containing the mixed powder obtained by mixing 75 wt % Kaolin and 25 wt % carbonic material, and the binder.
VI: High-resistive material containing the mixed powder obtained by mixing 55 wt % Talc and 45 wt % carbonic material, and the binder.
VII: High-resistive material containing the mixed powder obtained by mixing 75 wt % Talc and 25 wt % carbonic material, and the binder.

In the above test samples I to VII, the weight ratio of the binder is 15 with respect to 100 weight ratio of the mixed powder. The binder is novolac phenol aldehyde resin.

Figure 8:
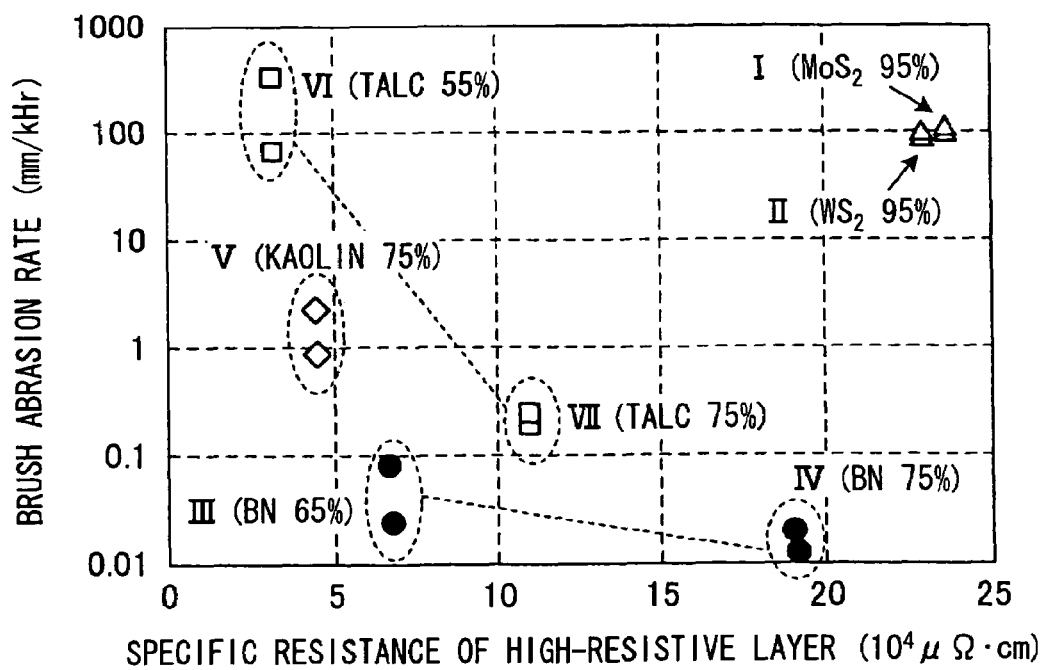
FIG. 8 is a graph showing the relationship between a specific resistance of a high-resistive layer and an abrasion rate of a brush according to a fifth embodiment of the present invention.

In the abrasion test, d.c. motors having the commutator segments in which the high-resistive layers are made of the respective high-resistive materials I to VII are rotated for a predetermined time period. The abrasion rate of the brushes 4 of the respective d.c. motors is measured, as shown in FIG. 8. In FIG. 8, a horizontal axis represents a specific resistance ($10^4 \mu\Omega cm$) of the high-resistive layer 62 and a vertical axis represents the abrasion rate of the brush 4 (abraded amount per unit of time) (mm/kHr).

As shown in FIG. 8, on the test samples III, IV, V, and VII, the abrasion rate of the brush 4 is low. Therefore, it is considered that the inorganic substances contained in the test samples III, IV, V, and VII are suitably used as the inorganic substance in the high-resistive material. On the other hand, the abrasion rate of the brush 4 is relatively high, on the test samples I, II, and VI. Therefore, some contrivance is required to use the inorganic substances contained in the test samples I, II, and VI as the high-resistive material.

Sixth Embodiment

In the above embodiments, it is considered that hexagonal boron nitride is suitably used as the inorganic substance of the high-resistive material. In the sixth embodiment, therefore, a specific resistance, a specific gravity, a flexural strength, hardness of the high-resistive layer 42, 62 containing hexagonal boron nitride and carbonic material are measured. A mixing ratio of hexagonal boron nitride to the carbonic material is changed, as shown in FIGS. 9 to 12.

In the high-resistive layer 42, 62, the high-resistive material is made by adding novolac phenol aldehyde resin (15 weight ratio) as the binder into mixed material (100 weight ratio) that contains hexagonal boron nitride and carbonic material. The mixing ratio of hexagonal boron nitride to the mixed material is changed in a range between 45 wt % and 100 wt %. For example, when the mixing ratio of hexagonal boron nitride is 45 wt %, the ratio of the carbonic material is 55 wt %. When the mixing ratio of hexagonal boron nitride is 100 wt %, the carbonic material is not contained.

Figure 9:
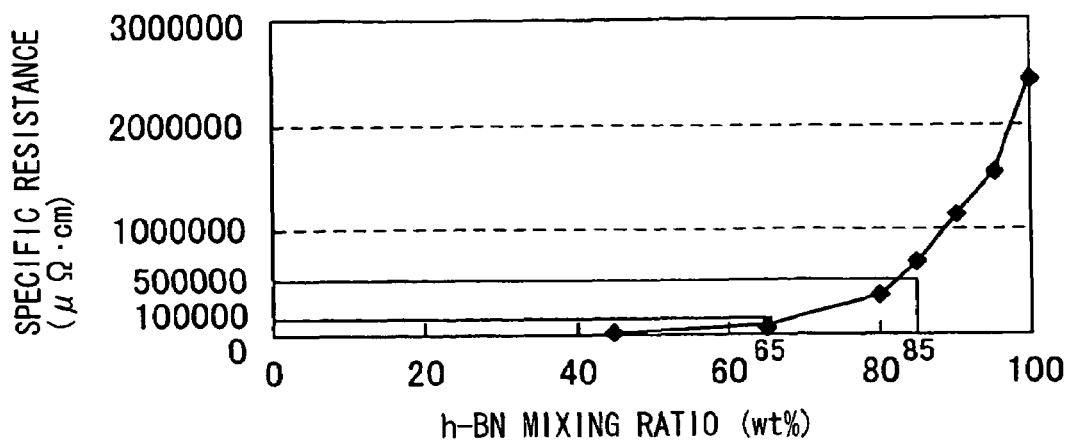
FIG. 9 is a graph showing the relationship between a mixing ratio of hexagonal boron nitride and a specific resistance of a high-resistive layer according to a sixth embodiment of the present invention.

In FIG. 9, a horizontal axis represents the mixing ratio (wt %) of hexagonal boron nitride. A vertical axis represents the specific resistance ($\mu\Omega \cdot cm$) of the high-resistive layer 42, 62. The change of the specific resistance in accordance with the change of the mixing ratio of hexagonal boron nitride is measured. As shown in FIG. 9, the specific resistance of the high-resistive layer 42, 62 highly increases when the mixing ratio of the hexagonal boron nitride increases.

Figure 10:
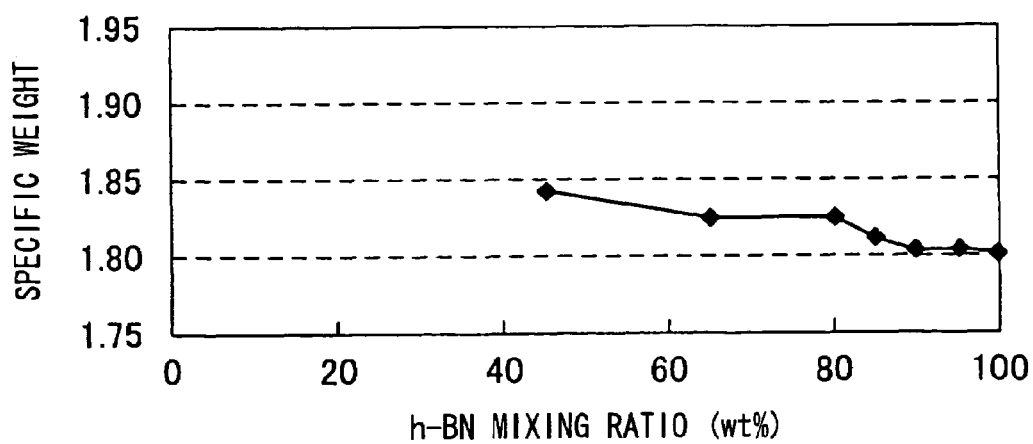
FIG. 10 is a graph showing the relationship between the mixing ratio of hexagonal boron nitride and a specific weight of the high-resistive layer according to the sixth embodiment of the present invention.

In FIG. 10, a horizontal axis represents the mixing ratio (wt %) of the hexagonal boron nitride. A vertical axis represents the specific weight of the high-resistive layer 42, 62. The change of the specific weight in accordance with the change of the mixing ratio of the hexagonal boron nitride is measured. As shown in FIG. 10, the specific weight of the high-resistive layer 42, 62 decreases with the increase of the mixing ratio of the hexagonal boron nitride.

Figure 11:
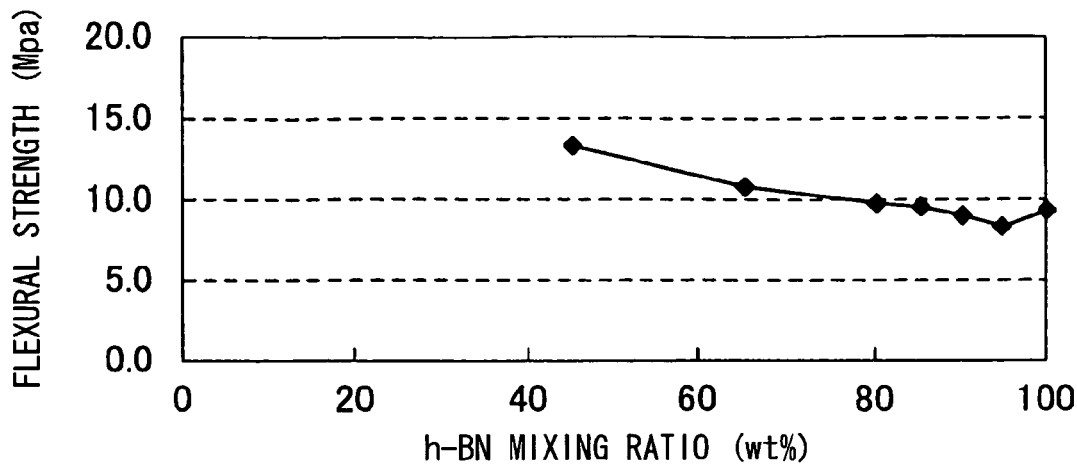
FIG. 11 is a graph showing the relationship between the mixing ratio of hexagonal boron nitride and flexural strength of the high-resistive layer according to the sixth embodiment of the present invention.

In FIG. 11, a horizontal axis represents the mixing ratio (wt %) of the hexagonal boron nitride, and a vertical axis represents the flexural strength (MPa) of the high-resistive layer 42, 62. The change of the flexural strength in accordance with the change of the mixing ratio of the hexagonal boron nitride is measured. As shown in FIG. 11, the flexural strength of the high-resistive layer 42, 62 decreases with the increase of the mixing ratio of the hexagonal boron nitride.

Figure 12:
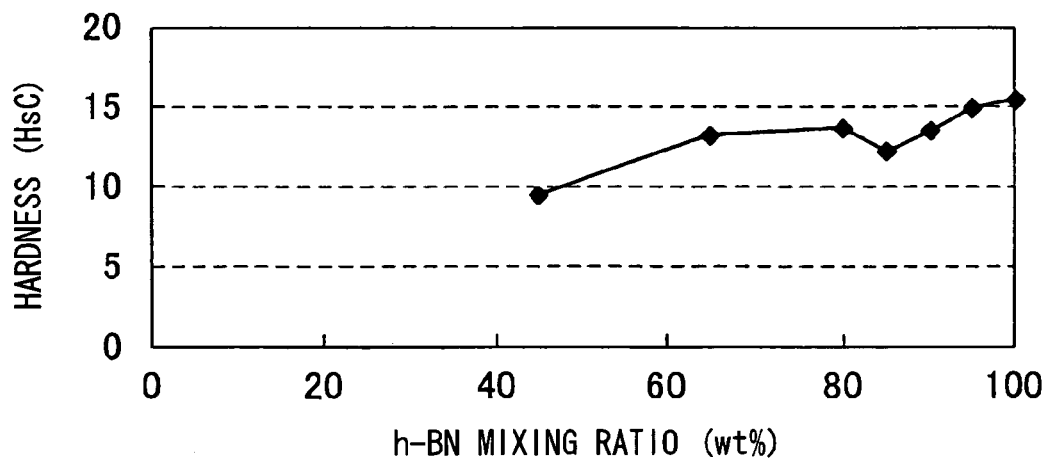
FIG. 12 is a graph showing the relationship between the mixing ratio of hexagonal boron nitride and hardness of the high-resistive layer according to the sixth embodiment of the present invention.

In FIG. 12, a horizontal axis represents the mixing ratio (wt %) of the hexagonal boron nitride, and a vertical axis represents hardness (HsC) of the high-resistive layer 42, 62. The change of the hardness in accordance with the change of the mixing ratio of the hexagonal boron nitride is measured. As shown in FIG. 12, the hardness of the high-resistive layer 42, 62 increases with the increase of the mixing ratio of the hexagonal boron nitride.

Accordingly, the specific resistance largely changes in accordance with the change of the mixing ratio, although the specific weight, the flexural strength and the hardness do not remarkably change. Therefore, the specific resistance significantly affects the occurrence of the discharging phenomenon between the brush 4 and the commutator segments 5. It is preferable to decide the mixing ratio of hexagonal boron nitride so that the specific resistance is within a suitable range. Specifically, it is preferable that the specific resistance of the high-resistive layer is within a range between $20 \times 10^4 \mu\Omega \cdot cm$ ($2 \times 10^{-3} \Omega \cdot m$) and $30 \times 10^4 \mu\Omega \cdot cm$ ($3 \times 10^{-3} \Omega \cdot m$), and the mixing ratio of the hexagonal boron nitride to the mixed material is in a range between 65 wt % and 85 wt %.

Seventh Embodiment

In the seventh embodiment, an effect obtained from the low-resistive material containing graphite particles having copper plate coatings is verified in the following manner.

In an examination, a d.c. motor (rotary electric machine) 10 having the commutator 5 and the pair of brushes 4 is used. Contact resistance between the brushes 4 and the commutator 5 is measured when the d.c. motor 10 is operated in air and when it is operated in gasoline as in an liquid condition.

Specifically, the voltage (V) of electric current passing from one brush 4 to another brush 4 through the commutator 5 and the armature winding is measured. It is considered that the higher the voltage is, the higher the contact resistance is. Here, specific resistances of the brushes 4 and the commutator 5 are not considered because the specific resistances of those members are significantly small as compared with the above contact resistance.

In the d.c. motor 10, each of the commutator segments 6 is constructed by a single layer made of the low-resistive material. Further, the low-resistive material contains graphite particles having copper plate coatings. The content of copper is 65 wt % in the graphite particles. The brushes 4 contain graphite and the binder made of phenol aldehyde resin.

As a reference, the contact resistance (voltage) of a reference d.c. motor is measured. In the reference d.c. motor, each of the commutator segments is constructed by a single layer of the low-resistive material containing graphite particles without having copper plate coatings.

The d.c. motor 10 and the reference d.c motor are placed in air and in the gasoline. The contact resistances are measured when the d.c. motor is at rest and when the d.c. motor is in operation. As the operation condition of the respective d.c. motors during the operation, load current (current applied from one brush 4 to another brush 4 through the commutator 5 and the armature windings) is 5 A, and the rotational speed is 6000 rpm. Test results are shown in Table 2.

TABLE 2

| | Contact Resistance (V) | | | |
|---|---|---|---|---|
| | Air | | Gasoline | |
| | Rest | Operation | Rest | Operation |
| D.C. Motor 10 | 0.5 | 0.5 | 0.4 | 0.2 |
| Reference Motor | 0.7 | 0.7 | 0.7 | 1.5 |

As shown in Table 2, the contact resistance of the d.c. motor 10 is smaller than that of the reference motor, in any test conditions. Especially, regarding the reference d.c. motor, the contact resistance during the operation in the gasoline is much higher than that in the air. On the other hand, regarding the d.c. motor 10, the contact resistance during the operation in the gasoline is lower than that in the air.

Accordingly, when the low-resistive material of the low-resistive layer 61 contains graphite particles having copper plate coatings, the contact resistance between the brushes 4 and the commutator 5, when operated in the gasoline, is significantly reduced. Similar results can be obtained when the brushes 4 are constructed by the low-resistive layer 41 and the high-resistive layer 42.

Eighth Embodiment

Relationship between a porosity (%) of the high-resistive material for the high-resistive layer 42, 62 and a specific resistance (%) is examined to verify effects obtained by the high-resistive layer 42, 62 when the porosity is decreased.

A test sample of the high-resistive layer 42, 62 is produced by adding the binder of phenol aldehyde resin to the mixed material containing 75 wt % hexagonal boron nitride and 25 wt % graphite. Further, plural samples having different porosity are prepared. Each sample is immersed in gasoline and the electric current (0.1 A) is applied. In this condition, the change of the specific resistance of each sample with time elapsed is measured.

Figure 13:
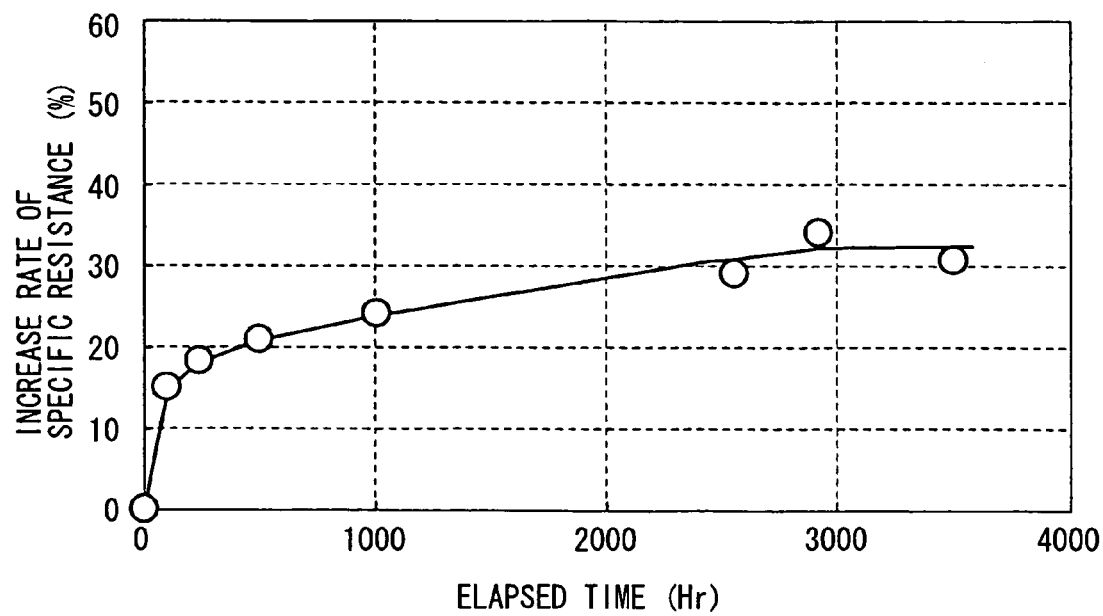
FIG. 13 is a graph showing the relationship between an elapsed time and a rate of increase of a specific resistance of a high-resistive layer according to an eighth embodiment of the present invention.

FIG. 13 is a graph showing the increase of the specific resistance of the sample having 22% porosity. A horizontal axis represents elapsed time (Hr), and a vertical axis represents the increase (%) of the specific resistance. Here, an initial specific resistance of the sample at an initial state is 100%. The increase (%) in the specific resistance is measured based on an increase rate (%) of the specific resistance with respect to the initial specific resistance with the time elapsed.

According to the graph shown in FIG. 13, the increasing rate of the specific resistance increases with the elapsed time. However, after a predetermined time elapsed, the increasing rate becomes stabilize. Namely, the specific resistance increases while gasoline is filling in pores of the sample. When the pores are saturated with gasoline, the increase of the specific resistance becomes plateau.

Figure 14:
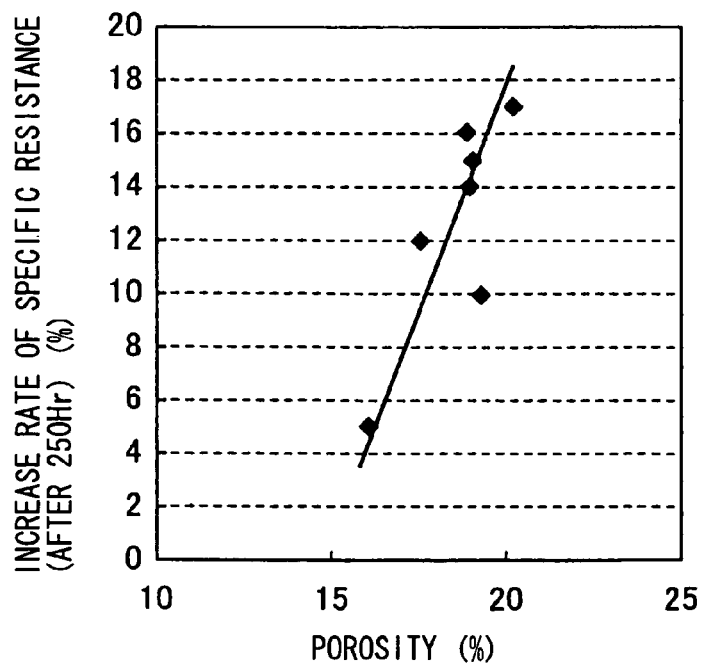
FIG. 14 is a graph showing the relationship between a porosity of the high-resistive layer and a rate of increase of a specific resistance of the high-resistive layer according to the eighth embodiment of the present invention.

Based on the above results, relationship between the porosity (%) and the increase (%) in the specific resistance is shown in a graph of FIG. 14. A horizontal axis represents the porosity (%) of the sample. A vertical axis represents a rate of increase of the specific resistance of the sample, at a time when 250 hours elapsed after immersed in gasoline. According to the graph, the specific resistance increases with the increase in the porosity.

In use of a d.c. motor, if the specific resistance of the high-resistive layer 42, 62 highly increases (e.g. the rate of increase is equal to or higher than 60%), it is likely to influence on the rectification. Therefore, it is preferable to make the porosity of the high-resistive layer 42, 62 equal to or lower than 30%. Further, it is preferable to reduce the rate of increase of the specific resistance equal to or lower than 20%. Therefore, it is more preferable to make the porosity of the high-resistive layer 42, 62 equal to or lower than 20%.

If the porosity exceeds 30%, strength of the high-resistive layer 42, 62 is likely to be insufficient. However, it is difficult to produce the high-resistive layer 42, 62 having significantly small porosity. Therefore, it is preferable to make the porosity equal to or higher than 15%. Here, the porosity is easily reduced by increasing the forming pressure while forming the high-resistive layer 42, 62.

Ninth Embodiment

Durability of the brushes 4, which contacts the commutator segments 6 having the low-resistive layer 61 and the high-resistive layer 62, is verified. The brushes 4 are made by adding the binder of phenol aldehyde resin to graphite containing carbon fiber (CF).

The change of asperities (projections or depressions) (mm) formed on the surfaces of the commutator segments 6 with elapsed operation time (Hr) of a d.c. motor is measured.

As test samples, d.c. motors S1 to S3 are prepared. Each motor has the brushes 4 produced by adding the binder of phenol aldehyde resin to the mixed material containing carbon fiber and graphite. Here, in the motor S1, the mixed material contains 1 wt % carbon fiber and 99 wt % graphite. In the motor S2, the mixed material contains 2 wt % carbon fiber and 98 wt % graphite. In the motor S3, the mixed material contains 3 wt % carbon fiber and 97 wt % graphite. The length of each fiber of the carbon fiber is in a range between 30 µm and 300 µm. The diameter of each fiber is in a range between 5 µm and 15 µm.

The low-resistive material of the low-resistive layer 61 is produced by adding the binder of phenol aldehyde resin to graphite. The high-resistive material of the high-resistive layer 62 is produced by adding the binder of phenol aldehyde resin to the mixing material containing 75% hexagonal boron nitride and 25 wt % graphite.

Figure 15:
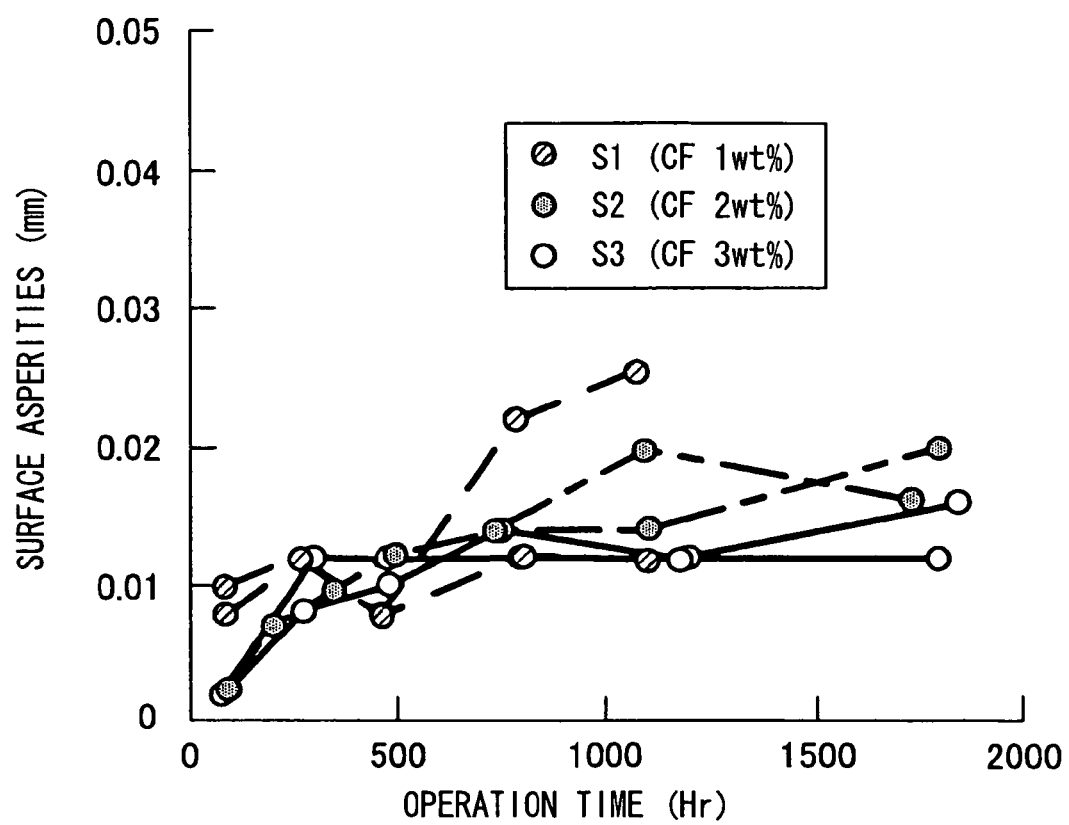
FIG. 15 is a graph showing the relationship between an operation time and size of surface asperities of commutator segments according to a ninth embodiment of the present invention.

The change of surface asperities generated on the above commutator segments 6 is measured, and shown in a graph of FIG. 15. In the test, two samples are used for each of the motors S1 to S3.

According to the result, although the surface asperities are increased with the time for the sample motors S1 to S3, the surface asperities are not significantly increased. Therefore, it is considered that the surfaces of the commutator segments 6 are maintained smooth even if the motor is used for a long time.

Specifically, the increase of the surface asperities of the motor S2 is smaller than that of the motor S1. Further, the increase of the surface asperities of the motor S3 is smaller than that of the motor S2. Therefore, it is considered that the increase of the surface asperities is suppressed with the increase of a content of carbon fiber. Especially, in the motor S3, the surface asperities do not generally change even over extended period of use.

In the motors S1 to S3, because the increase of the surface asperities is suppressed, the discharge phenomenon between the brushes 4 and the commutator segments 6 is further effectively reduced. Therefore, durability of the brushes 4 and the commutator segments 6 improve.

If the content of carbon fiber is highly increased, the surfaces of the commutator segments 6 are likely to be abraded more than necessary. Therefore, it is preferable that the content of carbon fiber is equal to or less than 10 wt %.

The increase of the surface asperities of the motors S1 to S3 is suppressed by the following reasons. Because the carbon fiber having high hardness is contained in the brushes 4, the surfaces of the commutator segments 6, which have the high-resistive layers 62 and the low-resistive layer 61, are intentionally slightly abraded when the motor is operated. The low-resistive layer 61 is made of the low-resistive material containing graphite as a main substance, and the high-resistive layer 62 is made of the high-resistive material containing hexagonal boron nitride and graphite as main substances. The low-resistive layer 61 and the high-resistive layer 62 have similar machinability or abradability (i.e. degree of abrasion). Therefore, when the commutator segments 6 are slightly abraded by the brushes 4, the high-resistive layer 62 and the low-resistive layer 61 are generally equally abraded. Accordingly, the surfaces of the commutator 6 can be maintained generally smooth. The machinability is determined based on Moh's hardness and cleavage.

Also in the d.c. motor in which each brush 4 is constructed by the high-resistive layer 42 and the low-resistive layer 41 and the commutator segments 6 are made by adding the binder to the graphite containing the carbon fiber, similar effects can be obtained.

In the above embodiments, if a content of the inorganic substance of the high-resistive material is equal to or less than 20 wt %, it is difficult to increase the specific resistance of the high-resistive layer sufficiently higher than the specific resistance of the low-resistive layer. Therefore, it may be difficult to improve rectification and durability. On the contrary, if the content of the inorganic substance of the high-resistive material is highly increased, the high-resistive layer may become in a condition having an insulation. Therefore, it is preferable that the content of the inorganic substance of the high-resistive material is equal to or lower than 90 wt %.

As the inorganic substance, it is preferable to have the specific resistance equal to or higher than $1\times10^{-2}$ Ω·m (1 Ω·cm), the boiling point equal to or greater than 1000° C., the Moh's hardness in a range between level 1 to level 2, which is similar to Moh's hardness of the low-resistive material.

When the specific resistance of the inorganic substance is equal to or higher than $1\times10^{-2}$ Ω·m, the discharge phenomenon between the brushes 4 and the commutator segments 6 is effectively suppressed. When the boiling point is equal to or higher than 2000° C., durability, such as heat resistance and abrasion resistance, of the brushes 4 and the commutator 5 is effectively improved. Further, when the Moh's hardness of the inorganic substance is within a range between level 1 to level 2, that is, when the Moh's hardness of the inorganic substance is similar to that of the low-resistive material, the low-resistive layer and the high-resistive layer are equally abraded when the brushes 4 slide and contact with the commutator segments 6. Therefore, since the surfaces of the brushes 4 and commutator segments 6 are maintained smooth, occurrence of discharge phenomenon (i.e. sparks) due to vibration of the brushes 4 is reduced.

Since the low-resistive material and the high-resistive material contain the carbonic material, such as graphite, conductivity and durability of the brushes 4 and the commutator 5 are further improved. As the binder, synthetic resin such as phenol aldehyde resin is used.

When the low-resistive material contains graphite particles having the copper plate coating, the contact resistance of the low-resistive layer is decreased. In a case that the brush and the commutator are used in liquid, the above effect is outstanding. In this case, since the gap of contact resistance between the low-resistive layer and the high-resistive layer is increased, rectification of in the d.c. motor is further improved. Here, the graphite particle having the copper plate coating is produced by coating the surface of the graphite particle with copper.

As the inorganic substance, boron nitride is preferably used. In this case, durability and conductivity of the brushes 4 and the commutator 5 are effectively improved. Further, molybdenum disulfide, tungsten disulfide, and minerals such as kaolin and talc can be used as the inorganic substance.

The high-resistive material is preferably produced by adding the binder to the mixed material containing hexagonal boron nitride (65 wt % to 85 wt %) and the carbonic material (35 wt % to 15 wt %). In this case, conductivity and durability of the brush 4 and the commutator 5 are effectively improved.

When the content of boron nitride in the mixed material is smaller than 65 wt %, the specific resistance of the high-resistive layer is decreased. In this case, it may be difficult to sufficiently maintain the rectification and durability of the brushes 4 and the commutator 5. On the other hand, when the content of boron nitride exceeds 85 wt % in the mixed material, the specific resistance of the high-resistive layer is increased more than necessary. This may bring about a situation in which the high-resistive layer is provided with an insulator. Therefore, it is likely to cause discharge phenomenon at the boundary between the low-resistive layer and the high-resistive layer.

In the high-resistive layer made of the high-resistive material containing boron nitride, it is preferable to have porosity equal to or less than 30%. When the brushes 4 and the commutator 5 are used in liquid, the increase of the specific resistance of the high-resistive layer with the time elapsed is effectively suppressed. The porosity is a ratio of volume of pores to a total volume of the high-resistive layer.

In general, if the surfaces of the brushes 4 and the commutator segments 6 are not smooth, the brushes 4 vibrate on the surfaces of the commutator segments 6. This results in deterioration of the life of the brushes 4 and the commutator segments 6. In the above embodiments, the commutator segments 6 contain carbon fiber providing sufficient hardness. Therefore, the surface of the brush 4 having the high-resistive layer 42 and the low-resistive layer 41 is intentionally slightly abraded by the commutator segments 6. Alternatively, the brush 4 contains carbon fiber. In this case, the surfaces of the commutator segments 6 having the high-resistive layer 62 and the low-resistive layer 61 are intentionally slightly abraded by the brush 4. Accordingly, the surfaces of the commutator segments 6 are maintained smooth. As a result, the occurrence of the discharge phenomenon between the brushes 4 and the commutator segments 6 is effectively suppressed. Further, it is preferable that the high-resistive layer and the low-resistive layer have similar machinability to maintain those surfaces smooth.

Further, it is preferable that the content of carbon fiber is in a range between 1 wt % and 10 wt % with respect to the mixed material containing graphite and carbon fiber. In this case, the surfaces of the brushes 4 and the commutator segments 6 are maintained further smooth. If the content of carbon fiber is smaller than 1 wt %, it may be difficult to maintain the surfaces of the commutator segments 6 and the brushes 4 smooth because the content of the carbon fiber is very low. On the other hand, if the content of carbon fiber exceeds 10 wt %, the surface of the brushes 4 or commutator segments 6 are likely to be abraded more than necessary because the content of carbon fiber is very high.

The present invention is not limited to the above embodiments, but may be implemented in other ways without departing from the spirit of the invention.

What is claimed is:

1. A commutator having a plurality of commutator segments which make contact with a brush, each of the commutator segments comprising:
    a low-resistive layer made of a low-resistive material; and
    a high-resistive layer made of a high-resistive material having a specific resistance higher than that of the low-resistive material, wherein
    the high-resistive material contains boron nitride, which has a specific resistance higher than that of the low-resistive material, more than 20 wt % with respect to total weight of the high-resistive material.

2. The commutator according to claim 1, wherein the low-resistive material contains a carbonic material and a binder, and
    the high-resistive material contains a carbonic material, a binder and the boron nitride.

3. The commutator according to claim 1, wherein the low-resistive material contains graphite particles having copper plate coatings.

4. The commutator according to claim 1, wherein the high-resistive material is composed of a mixed material and a binder, and the mixed material consists of boron nitride in a range between 65 wt % and 85 wt % and a carbonic material.

5. The commutator according to claim 4, wherein the high-resistive layer has a porosity equal to or less than 30%.

6. The commutator according to claim 1, wherein the high-resistive layer has a porosity equal to or less than 30%.

\* \* \* \* \*